United States Patent [19]
Mehltretter et al.

[11] Patent Number: 4,971,266
[45] Date of Patent: Nov. 20, 1990

[54] GUIDING METHOD AND ON-BOARD GUIDANCE SYSTEM FOR A FLYING BODY

[75] Inventors: Ludwig Mehltretter, Riemerling; Hans Hummelsberger, Holzkirchen; Hans Grundner, Anzing, all of Fed. Rep. of Germany

[73] Assignee: Messerschmitt-Boelkow-Blohm GmbH, Munich, Fed. Rep. of Germany; DEX

[21] Appl. No.: 380,134

[22] Filed: Jul. 14, 1989

[30] Foreign Application Priority Data

Jul. 14, 1988 [DE] Fed. Rep. of Germany ....... 3823814

[51] Int. Cl.$^5$ ...................... G01S 13/94; G01S 13/44; G01S 7/44; F41G 7/22
[52] U.S. Cl. ............................... 244/003.190; 364/447
[58] Field of Search ...................... 244/3.15, 3.19, 181; 364/447

[56] References Cited

U.S. PATENT DOCUMENTS

| | | | |
|---|---|---|---|
| 2,930,035 | 3/1960 | Altekruse | 244/3.15 |
| 3,362,657 | 1/1968 | McDaniel | 244/3.19 |
| 4,144,571 | 3/1979 | Webber | 364/450 |
| 4,160,974 | 7/1979 | Stavis | 244/3.19 |

Primary Examiner—Charles T. Jordan
Assistant Examiner—Michael J. Carone
Attorney, Agent, or Firm—W. G. Fasse; D. H. Kane, Jr.

[57] ABSTRACT

An on-board guidance system for a flying body, such as a cruise missile, includes a radar device for a self-sufficient scanning of the topography during flight. Scanning antennas provide signals for evaluation and further application in a search and guide logic circuit. An on-board computer calculates an exact horizon angle which is used as an altitude guide or control value.

10 Claims, 3 Drawing Sheets

GUIDING METHOD AND ON-BOARD GUIDANCE SYSTEM FOR A FLYING BODY

FIELD OF THE INVENTION

The invention relates to a cruise missile guide system carried on-board of such a cruise missile for monitoring the topography during the flight in a self-contained, autonomous manner. The invention also relates to a method for guiding such a missile or flying body.

BACKGROUND INFORMATION

Flying bodies such as cruise missiles equipped with their own propulsion plant that becomes effective after launching the cruise missile, are also equipped with means for an autonomous target acquisition and homing toward that target. These means conventionally employ radar altitude meters including lidar or sonar systems or inertial guidance systems. These conventional systems have their problems, especially when the missile traverses a hilly topography at a low altitude.

A low altitude, topography hugging radar is known from German Patent Publication (DE-OS) No. 3,417,073. However, that system operates on the basis of previously stored topographic data which requires a large computer effort and expense.

German Patent Publication (DE-PS) No. 3,016,554 discloses an orientation system operating with the pulse-doppler radar principle. Such systems are carried on board of aircraft. Such system enables an observer to see the topography relative to which the aircraft is flying, independently of any optical visibility which may be obscured by an obstacle or the like. The system employs radar technology to make the topography visible, whereby two rod-type antennas are used to acquire the necessary data with the pulse doppler radar principle to provide the required perspective illustration of a topography section. The improvement provided by the system of German Patent Publication No. 3,016,554 resides in the fact that a two-dimensional map is converted into a three-dimensional image on a radar screen. However, the known system has the disadvantage that the information density of data to be supplied to the on-board computer per unit of time is so high that it must be limited in order to avoid overloading the abilities of the on-board computer.

OBJECTS OF THE INVENTION

In view of the foregoing it is the aim of the invention to achieve the following objects singly or in combination:

to provide a system for guiding a flying body such as a cruise missile in such a way that the data flow quantity required for the guiding of the flying body is effectively reduced to the capabilities of the on-board computer so as to avoid overloading the computer;

to avoid the need for topographic maps and the storage of the respective information, including its display and observation on a radar screen;

to efficiently provide a horizon line for the autonomous guiding of a cruise missile; and to ascertain the horizon or inclination angle exactly for use as an altitude guiding value.

SUMMARY OF THE INVENTION

According to the invention there is provided an on-board guiding system for a flying body, such as a cruise missile, including an on-board radar measuring device for the automatic or self-contained scanning of the topography during flight, whereby the measured data are supplied for evaluation to an on-board computer. The sytem includes circuit means for forming the sum and the difference of the radar antenna lobes or portions thereof, whereby the sum signal and the difference signals are evaluated by superheterodyning in a respective circuit in such a way that the horizon line appears as an axis between the two antenna lobes.

According to the invention there is further provided a method for guiding/steering a flying body, such as a cruise missile, by using a monopulse radar system performing a frequency scanning/control, including a signal summing and signal difference forming channel, wherein a search tracking is performed with the antenna radiators of the system to establish the horizon line in the form of respective data or information representating the horizon line. When the horizon line has been acquired the mode of operation of the system is switched over to a tracking mode to cause the flying body to follow the horizon line. For this purpose guide signal or rather null control signal is formed from the information representing the horizon line, whereby any deviations of the flying body .from its course along the horizon line is corrected to keep the flying body in the desired position or rather desired course along the horizon line. The search tracking is repeated by the system any time the above mentioned null control signal is lost to reestablish the horizon line or rather the information representing the horizon line.

It is an advantage of the invention that topographic maps and the storage of such maps in a computer memory as well as their display on a radar screen are no longer necessary so that the present system is especially suitable for unmanned flying bodies.

BRIEF DESCRIPTION OF THE DRAWINGS

In order that the invention may be clearly understood, it will now be described, by way of example, with reference to the accompany drawings, wherein.

DETAILED DESCRIPTION OF PREFERRED EXAMPLE EMBODIMENTS AND OF THE BEST MODE OF THE INVENTION

Figure 5:
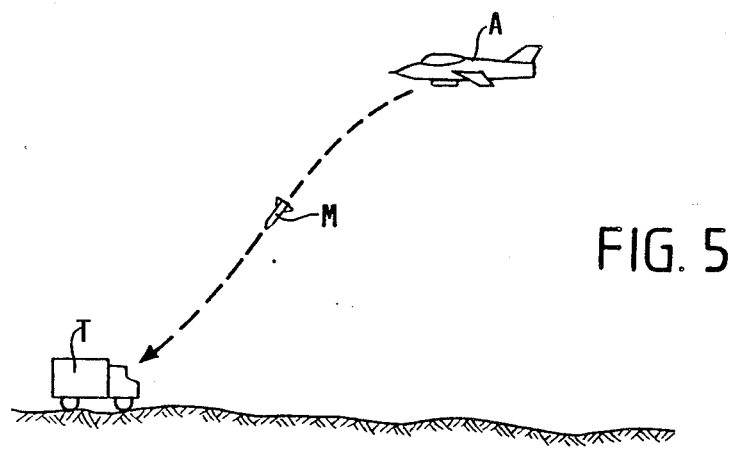
FIG. 5 illustrates one use or application of the present invention in an air-to-ground missile.

Referring first to FIG. 5, an aircraft A has just fired an air-to-ground missile M travelling toward a target T. The present invention relates to a guidance system suitable for a situation as just described with reference to FIG. 5 for guiding the missile M in an autonomous manner.

Figure 1:
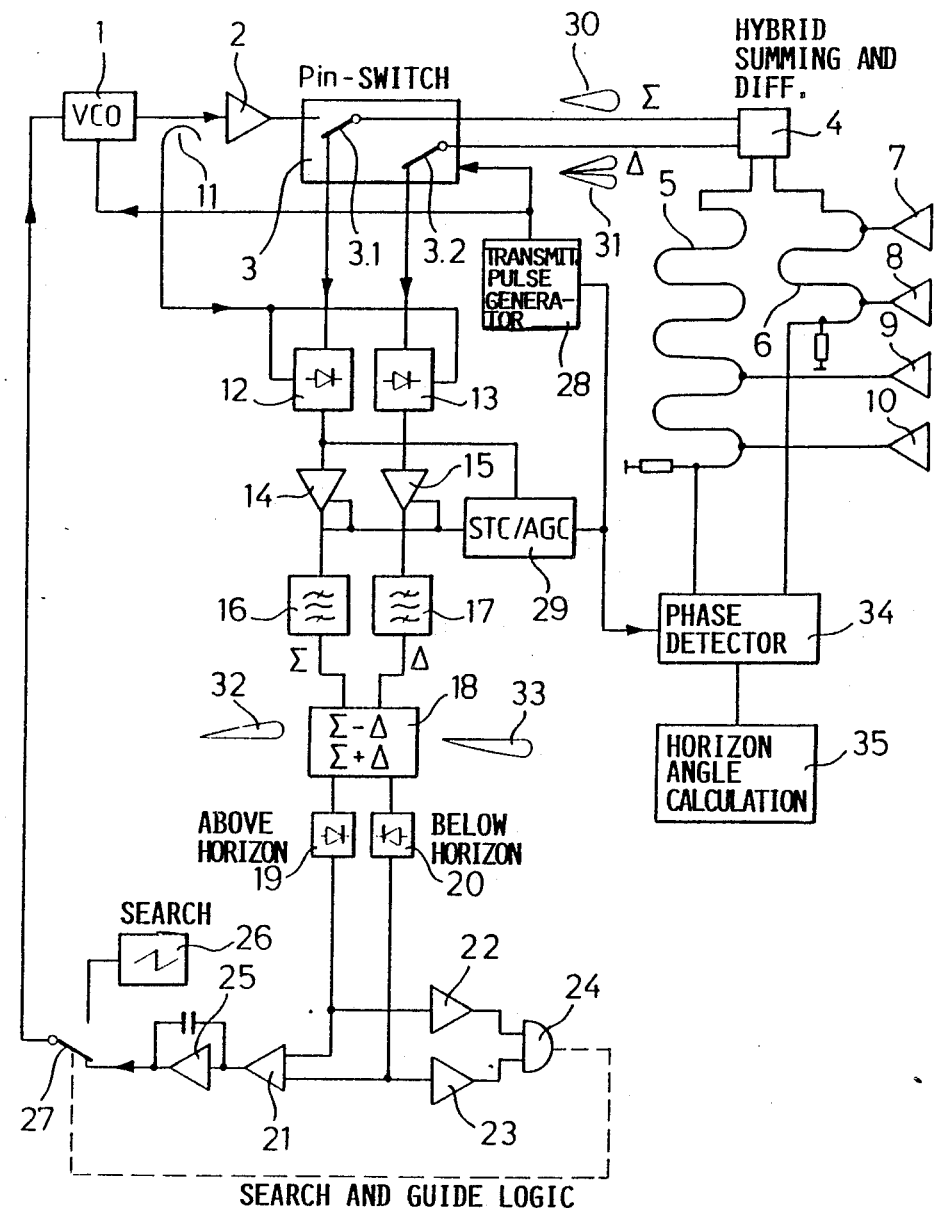
FIG. 1 shows a block circuit diagram of the guidance system according to the invention.
Figure 2:
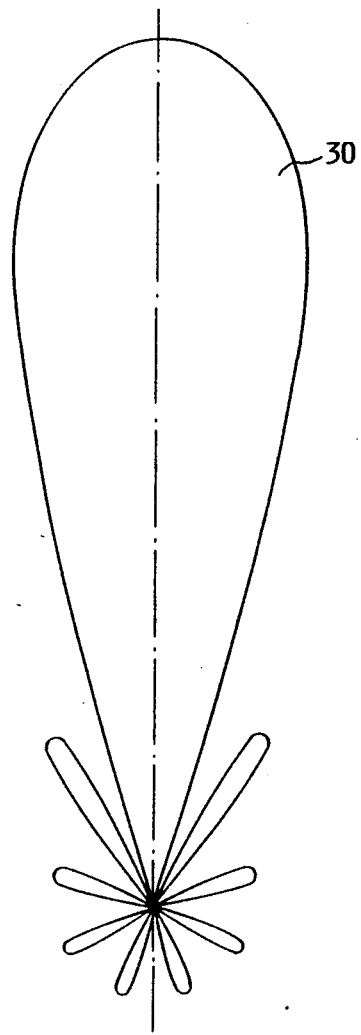
FIG. 2 illustrates a summing or sum diagram of the antenna lobes as derived in accordance with the teaching of the invention.
Figure 3:
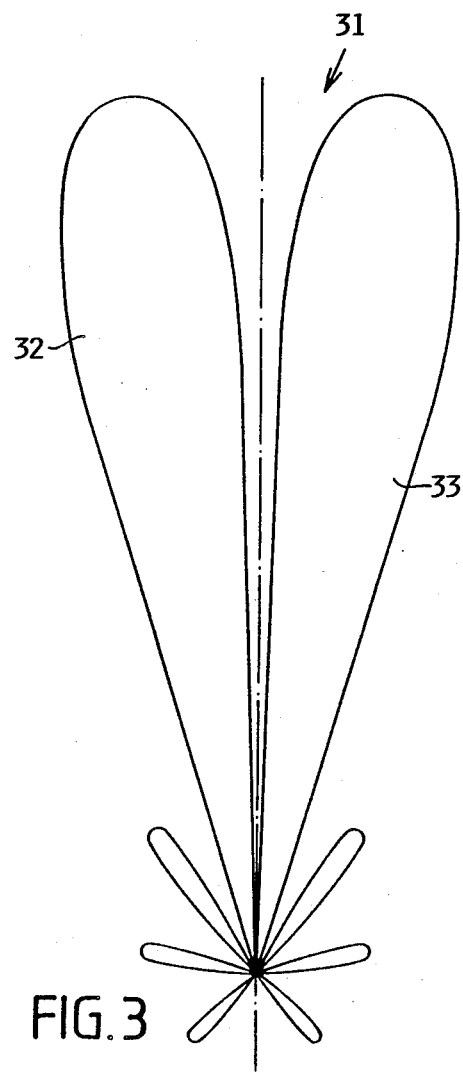
FIG. 3 is a difference diagram of the antenna lobes as derived with the present teaching, whereby the lobes of FIG. 3 are to be superimposed on the lobes of FIG. 2.

FIG. 1 shows a block circuit diagram of a flying body guiding system according to the invention, including a horizon sensor. The system operates as a pulse radar in accordance with the monopulse principle. The system includes an antenna comprising four radiators 7, 8, 9, and 10 which are movable by electronically controlled drive means for tracking purposes. The conventional drive means are not shown. The signal supply to a first pair of radiators 7 and 8 takes place through a first delay line 6. The signal supply to a second pair of radiators 9 and 10 takes place through a second delay line 5. Each radiator 7 to 10 is connected to its respective tap of its corresponding delay line, whereby the phase position of the signals supplied to the individual radiators can be modified or changed. As a result, the radiation characteristic of the antenna can be also modified by controlling the signal frequency. The two delay lines 5 and 6 with their radiators 9, 10 and 7, 8 respectively are coupled to a hybrid summing and differentiating circuit 4. The circuit 4 produces a summing signal as shown in FIG. 2 and a difference signal as shown in FIG. 3.

A transmitter 1 in the form of a voltage controlled oscillator, the frequency of which can be changed by means of a control signal voltage, produces a high frequency signal that is amplified by an amplifier 2. The output of the amplifier 2 is connected to a so-called "PIN switch" 3. A PIN contact 3.1 can take up two positions. In the shown position the PIN contact 3.1 connects the summing and differentiating circuit 4 to one input of a mixing circuit 12. In the other position the PIN contact 3.1 connects the output of the amplifier 2 to an input of the circuit 4. In that other position the signals from the voltage controlled oscillator 1 are supplied to the antenna radiators 7 to 9 with their respective phase relationship to produce the lobe shown in the form of the summing diagram of FIG. 2. Another input of the circuit 4 is connected to a further contact 3.2 of the PIN switch to a mixing circuit 13. During the pulse pauses the antenna system with the radiators 7, 8, 9, and 10 is connected through the contacts 3.1 and 3.2 to the mixers 12 and 13, whereby the mixer 12 receives the summing signal 30 as mentioned and the mixer 13 receives the difference signal 31. The second signal needed for the mixing is decoupled from the output of the voltage controlled oscillator 1 by a decoupling or directional coupler 11 and supplied in parallel to the mixers 12 and 13. Between the pulse pauses the frequency of the voltage controlled oscillator 1 is detuned to the extent of the intermediate frequency in order to receive the echo signal with the intermediate frequency amplifiers 14 and 15 and the filters 16 and 17. The control signal voltage is supplied as described below.

A further summing and differentiating network 18 receives the signals from the filters 16 and 17. The filter 16 provides the summing signal and the filter 17 provides the difference signal. The outputs of the circuit 18 are connected to rectifier circuits 19 and 20 for producing respective signals for the upper antenna lobe 32 and for the lower antenna lobe 33. A differential amplifier 21 is connected with its input to the two rectifier circuits 19 and 20 for producing a control voltage. The input of the differential amplifier 21 is connected through an integrator 25 and a switch 27 to the control input of the voltage controlled oscillator 1. A capacitor is connected in parallel to the integrator 25. The signal so supplied to the control input of the oscillator 1 varies the oscillator frequency, whereby the radiation direction angle varies accordingly so that the horizontal line appears as zero or neutral axis between the two lobes 32 and 33. This axis is precisely centered between these two lobes. If no signal is being received, the logic circuit 22, 23 connected between the outputs of the rectifier circuits 19 and 20 and the two inputs of an AND-gate 24, provides an output connected to operate the switch 27 for switching between the integrator 25 and a search generator 26. The search generator 26 moves the antenna lobes downwardly from above in a search function.

Figure 4:
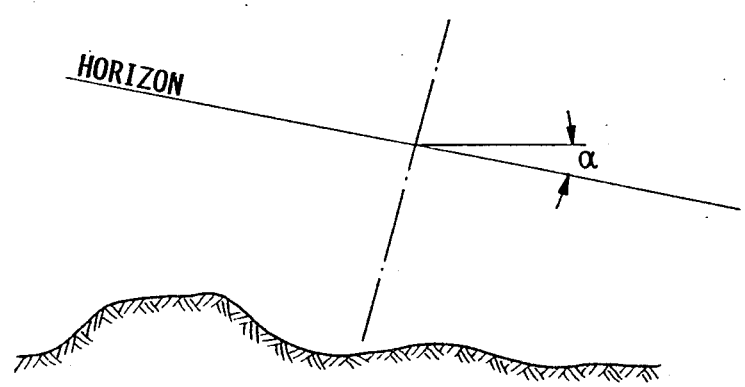
FIG. 4 is a schematic illustration of the horizon angle as ascertained according to the invention.

Referring to FIG. 4, the horizon angle $\alpha$ under which the horizon appears may be picked up as an analog signal at the switch 27. For increasing the accuracy it is, for example, possible for a phase angle of 0° to calibrate the system by means of a phase detector 29. A further embodiment permits ascertaining the horizon angle $\alpha$ through a phase meter at the antenna 28. The missile M is kept on course along the horizon line by a control signal that is first acquired by a search scanning operation of the radar antennas. The so acquired signal is referred to as null control signal and used as a tracking control signal after the search scanning is stopped and the system is switched over to the tracking mode for keeping the flying body on course along the horizon line, whereby any deviation of the flying body from the intended course is corrected. Any time the null control signal is lost, the search scanning mode is switched on again to reacquire the horizon line information.

Although the invention has been described with reference to specific example embodiments, it will be appreciated that it is intended to cover all modifications and equivalents within the scope of the appended claims.

What we claim is:

1. An on-board guidance system for a flying body, comprising radar means including electronically trackable antenna means for an autonomous scanning of the topography during flight for acquiring guidance information signals, on-board computer means for processing said guidance information signals to provide guide signals for guiding said flying body, said on-board computer means comprising heterodyning circuit means (18) for evaluating portions of antenna lobes of said antenna means as sum and difference signals in such a way that a horizon line appears as axis between both antenna lobes.

2. The on-board guidance system of claim 1, wherein said on-board computer means comprise search and guidance logic circuit means (21 to 27) for a signal evaluation and target tracking.

3. The on-board guidance system of claim 1, further comprising a differential amplifier (21) connected with its input to said heterodyning circuit means (18) through rectifying circuits (19, 20) and with its output to an integrator to provide a control voltage signal for controlling or varying the frequency of a transmitter (1) in the form of a voltage controlled oscillator the output signal of which is supplied to said radar antenna means.

4. The on-board guidance system of claim 1, wherein said on-board computer means comprise a horizon angle calculator connected to receive input signals for calculating a horizon inclination.

5. The on-board guidance system of claim 2, further comprising search generator means connected to said search and guidance logic circuit means for switching on said search generator means in response to an absence of a received signal for causing said radar antenna means to perform a downwardly directed searching motion, whereby antenna lobes travel in a downward direction.

6. The on-board guidance system of claim 1, further comprising PIN-switch means for transmitting radar impulses from a transmitter to said radar antenna means during a transmission mode and for connecting said radar antenna means to mixing circuits of said on-board computer means during a receiving mode of the system.

7. The on-board guidance system of claim 1, further comprising means for detuning the frequency of a radar transmitter (1) by an intermediate frequency during the transmission of a pulse, that is, between two pulse pauses, for receiving echo signals through circuit means (14 to 17).

8. The on-board guidance system of claim 1, wherein said on-board computer means comprise phase-detector means (34) including a horizon angle calculator (35) for determining a horizon angle ($\alpha$).

9. The on-board guidance system of claim 8, further comprising means for operating said phase detector means (34) in accordance with the monopulse principle for frequency scanning said electronically trackable radar antenna means.

10. A method for guiding/steering a flying body, comprising the following steps:
(a) using a monopulse radar system including a frequency scanning/control with a signal summing and signal difference forming channel,
(b) performing a search tracking with antenna radiators for acquiring horizon line information,
(c) switching over to a tracking mode operation upon completion of the search tracking, and using said horizon line information as a null control signal for performing said tracking mode operation to cause the flying body to follow the horizon line,
(d) guiding/steering said flying body to correct any deviations of the course of the flying body from said horizon line to keep the flying body in the required position relative to the horizon, and
(e) repeating said search tracking in response to losing said horizon line.

* * * * *